United States Patent [19]

Koch

[11] 4,252,876
[45] Feb. 24, 1981

[54] LITHIUM BATTERY

[75] Inventor: Victor R. Koch, Framingham, Mass.

[73] Assignee: EIC Corporation, Newton, Mass.

[21] Appl. No.: 53,941

[22] Filed: Jul. 2, 1979

[51] Int. Cl.[3] .......................................... H01M 10/36
[52] U.S. Cl. ................................................. 429/197
[58] Field of Search ............................. 429/194, 197

[56] References Cited

U.S. PATENT DOCUMENTS

| 3,185,590 | 5/1965 | Mayer et al. ........................ 136/6 |
| 3,468,716 | 9/1969 | Eisenberg ............................ 429/197 |
| 3,567,515 | 3/1971 | Maricle et al. ...................... 136/6 |
| 3,578,500 | 5/1971 | Maricle et al. ...................... 136/6 |
| 3,778,310 | 12/1973 | Garth .................................. 429/197 |
| 3,877,983 | 4/1975 | Hovsepian ........................... 136/6 |
| 3,915,743 | 10/1975 | Lauck .................................. 429/194 |
| 4,060,674 | 11/1977 | Klemann et al. ................... 429/194 |
| 4,163,829 | 8/1979 | Kronenberg ........................ 429/194 |

FOREIGN PATENT DOCUMENTS 1343853  1/1974  United Kingdom .

Primary Examiner—Donald L. Walton

[57] ABSTRACT

An electrolyte for a rechargeable electrochemical cell featuring diethylether, a cosolvent, and a lithium salt.

23 Claims, 6 Drawing Figures

LITHIUM BATTERY

The Government of the U.S.A. has rights in this invention pursuant to Contract N00014-77-C-0155 awarded by the Department of the Navy.

Field of the Invention

This invention relates to non-aqueous electrolytes for electrochemical cells employing lithium-containing electrodes.

BACKGROUND OF THE INVENTION

In a secondary battery employing a lithium anode it is desirable to employ an electrolyte system which provides high cycling efficiency, good conductivity, and reasonable cost. The number of times a lithium battery can be recharged, and the efficiency of each recharging are the measures of cycling efficiency. Cycling efficiency of the Li electrode is primarily a function of the ability of the electrolyte solvent to withstand reduction by lithium, which is a powerful reducing agent. When reduction occurs, reaction products form on the surface of the lithium electrode preventing subsequent smooth replating during the recharge cycle. This results in dendritic growth and consequently poor lithium morphology. Poor lithium morphology can also result from poor throwing power of the electrolyte or from specific electrolyte adsorption effects. Poor lithium morphology can result in: (1) electrical isolation of some of the plated lithium, making it unavailable for stripping during discharge; (2) short circuits between the electrodes due to dendritic growth; and (3) a rapid chemical reduction rate due to the increased electrode surface area. Also important is the ability of a solvent to dissolve the amount of salt necessary to provide adequate conductivity, and the conductivity features of particular salt and solvent choices.

A number of prior batteries—both primary and secondary—have employed a mixture of two or more solvents in an electrolyte system. A mixed solvent is disclosed in Garth U.S. Pat. No. 3,778,310, duPont British Pat. No. 1,343,853, Eisenberg et al. U.S. Pat. No. 3,468,716, Maricle et al. U.S. Pat. No. 3,567,515, Maricle et al. U.S. Pat. No. 3,578,500, Hovsepian U.S. Pat. No. 3,877,983, Klemann et al. U.S. Pat. No. 4,060,674, and Mayer et al. U.S. Pat. No. 3,185,590.

Although diethylether (DEE) is mentioned as a possible solvent component in a number of the above patents, and is even used as the sole solvent of one example in the Mayer patent, a problem associated with DEE is its very low conductivity. While conductivity can be improved by mixing DEE with a more conductive cosolvent, in general in a secondary cell one would expect a corresponding sacrifice of cycling efficiency, since the more conductive cosolvent choices are also more lithium-reactive.

Many possible solvents and combinations of solvents are mentioned in the above patents, including unsaturated heterocycles and saturated ethers such as DEE and tetrahydrofuran (Garth and duPont); pentacyclic esters, aliphatic ethers such as DEE and tetrahydrofuran, cyclic ketones, and aliphatic nitriles (Eisenberg); sulfur dioxide, trialkyl borates, boronic acid esters, tetraalkyl silicates, nitro alkanes, lactams, ketals, orthoesters, monoethers such as DEE, cyclic ethers such as tetrahydrofuran, dialkl sulfates, and alkyl sulfonates (Maricle); tetrahydrofuran, dimethyl carbonate, propylene carbonate, 1, 2 dimethoxyethane, dimethylformamide, trimethyl carbonate, ethyl-N, N-dimethyl carbonate, the dimethyl ether of diethylene glycol, cyclic ethers such as 1, 3 dioxolane, 4-methyl, 1, 3 -dioxolane, ethylene oxide, propylene oxide, butylene oxide, dioxane, and tetrahydrofuran, and aliphatic ethers such as 1, 2-dimethoxyethane, the dimethyl ether of diethylene glycol, and the diethyl ether of diethylene glycol (Hovsepian); ethers, esters, sulfones, sulfites, nitrites, and nitrates (Klemann); and ethers such as DEE, amines, amides, sulfoxides, and nitriles (Mayer).

SUMMARY OF THE INVENTION

I have discovered that, surprisingly, when certain volumes of some cosolvents are mixed with DEE to enhance conductivity, cycling efficiency, rather than being impaired, is actually enhanced as compared to pure DEE. Certain higher cosolvent volumes produce only slight drops in cycling efficiency, proportionally lower than the gain in conductivity. My invention thus provides an electrolyte which is relatively inexpensive and which demonstrates good conductivity, high cycling efficiency, low lithium reactivity, and ready availability in pure form.

The invention features an electrolyte comprising diethyl ether, a cosolvent, and a lithium salt such as $LiAsF_6$. In preferred embodiments, diethylether comprises at least 70% of the solvent by volume and the cosolvent comprises at least 5% of the solvent by volume.

DESCRIPTION OF THE PREFERRED EMBODIMENTS

We turn now to the description of preferred embodiments, after first briefly describing the drawings.

DRAWINGS

EMBODIMENTS

Figure 1:
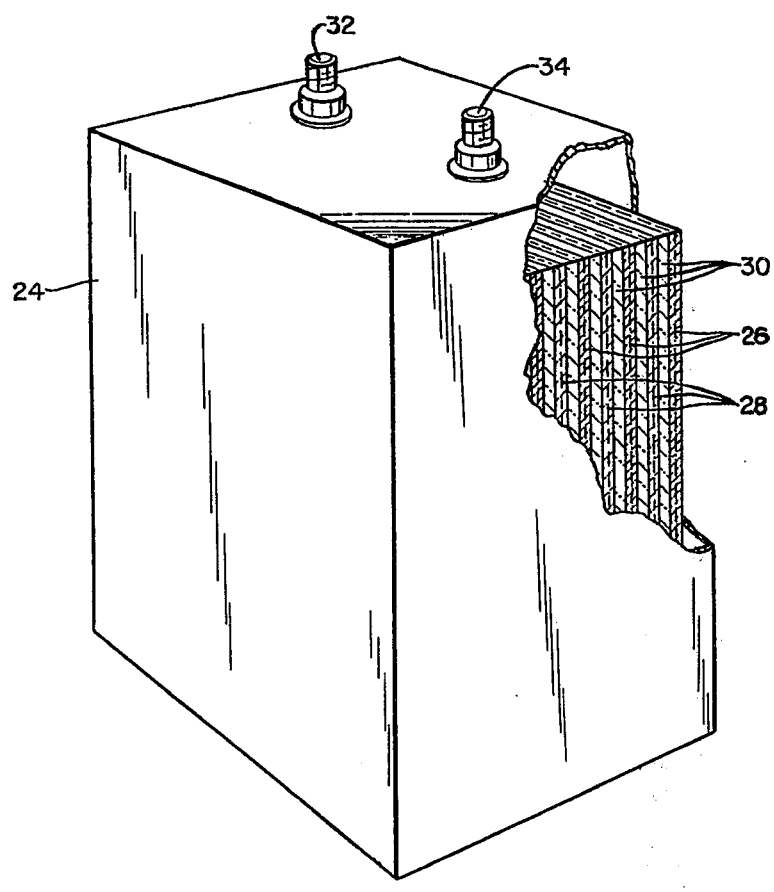
FIG. 1 is a schematic representation of a rechargeable battery employable with the subject electrolyte.

There is shown in FIG. 1 a schematic representation of an example of a rechargeable electrochemical cell which could be used in conjunction with the subject electrolyte. The illustrated battery comprises a sealed battery case 24 within which is disposed a plurality of flat negative electrodes 26 consisting of essentially pure lithium deposited on nickel substrates, a plurality of flat positive electrodes 28 consisting of titanium disulfide deposited on expanded nickel, and a plurality of separators 30 in the form of flat porous mats made of microporous polypropylene film (Celgard) or glass fibers. The positive and negative electrodes are arranged alternatively with one another and a separator is disposed between each pair of positive and negative electrodes.

The positive electrodes of the several cells are electrically coupled in parallel to a positive terminal 32 by suitable electrical conductors (not shown) in accordance with conventional battery fabrication technology, and the negative electrodes of the several cells are similarly connected to a negative battery terminal 34. The subject electrolyte surrounds the electrodes and separators and fills the interstices of the separators.

The advantages of the invention are best illustrated by the results of cycling efficiency and conductivity tests. The tests were designed to mimic the charge and discharge characteristics of the secondary Li electrode in a practical battery. Thus, a key experiment to evaluate electrolyte stability involved cycling Li to and from a Li rather than Ni substrate in a half-cell configuration. This was accomplished by plating a known amount of Li onto a Ni electrode, and then sequentially stripping and plating a lesser charge of Li. The amount of excess Li determines, in part, the number of "100%" cycles to be achieved. For example, a typical Li on Li cycling experiment consists of plating 4.5 coul/cm$^2$ Li onto a Ni electrode; 1.1 coul/cm$^2$ are then stripped leaving 3.4 coul/cm$^2$ of excess Li. Subsequent plating and stripping cycles employ 1.1 coul/cm$^2$. Were each cycle 100% efficient, the cell would cycle indefinitely with a 3.4 coul/cm$^2$ reserve of Li (efficiency bein Q stripped/Q plated). Of course, each stripping cycle is >100% efficient which means that each strip cuts into the Li reserve, yielding an apparent "100%" cycle until the Ni substrate is reached. At this point the excess Li is exhausted and one may calculate the average efficiency per cycle, $\bar{E}$:

$$\bar{E} = \frac{Q_s - \dfrac{Q_{ex}}{n}}{Q_s}$$

where $Q_s$ is the charge of Li stripped, $Q_{ex}$ is the amount of excess Li, and n is the number of "100%" cycles. At first, the value of $\bar{E}$ rises rapidly with increasing n; beyond 100 "100%" cycles, large increases in n provide only a fractional increase in $\bar{E}$.

All of the $\bar{E}$ values described herein were calculated from experiments in which the current density was fixed at 5 ma/cm$^2$. If current densities below this value were employed, one would expect even higher $\bar{E}$ values, based on studies conducted on tetrahydrofuran and 2-methyltetrahydrofuran/LiAsF$_6$ electrolytes. As some of the drawings illustrate, $\bar{E}$ values for a given solvent blend will also vary with salt concentration.

Figure 2:
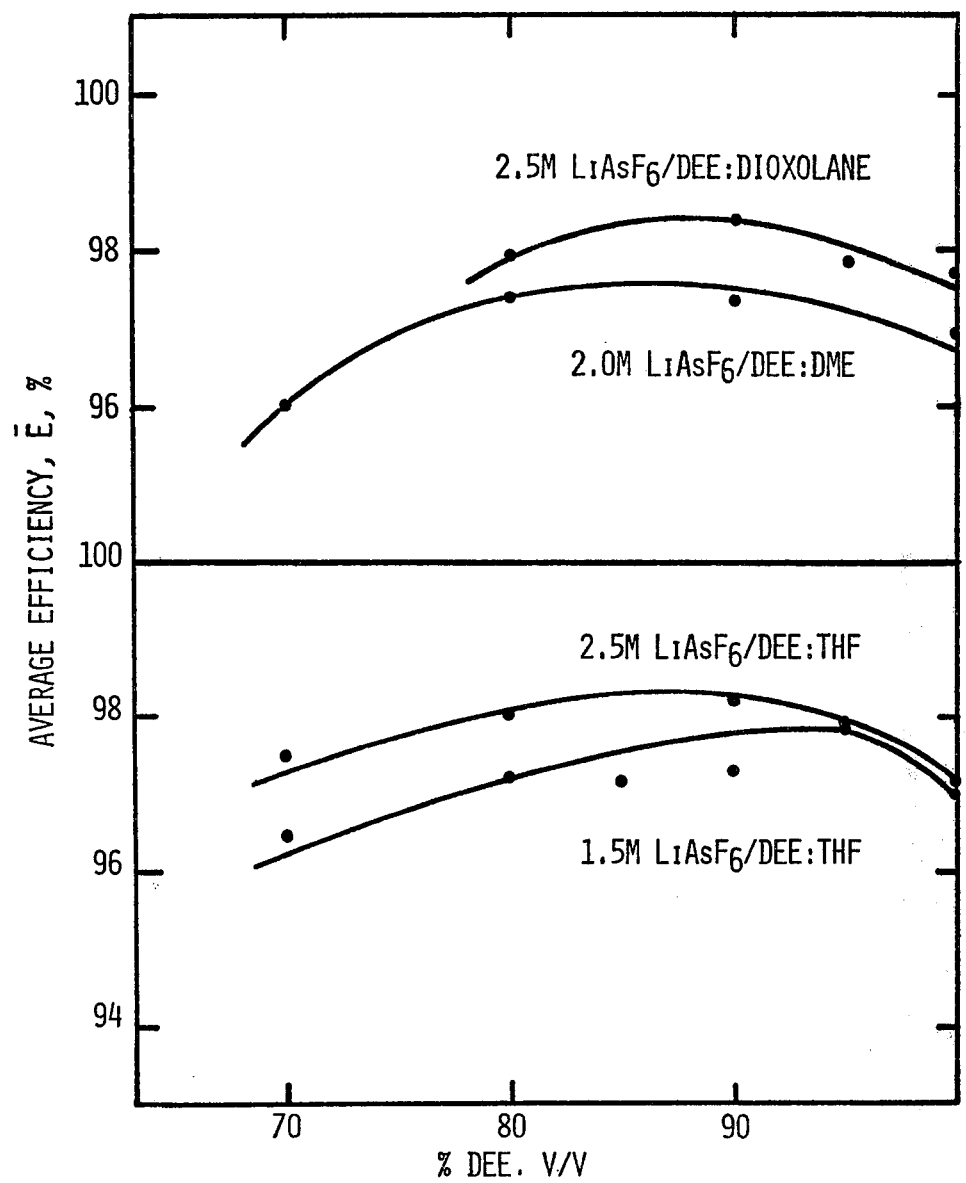
FIG. 2 is a graph of the relation between cycling efficiency and % DEE in four binary electrolytes.

There is shown in FIG. 2 a graph of the relation between cycling efficiency and % DEE in four binary electrolytes in which the cosolvent is a saturated ether. In all four blends the salt is LiAsF$_6$ (at different concentrations). The graph shows that the DEE:cosolvent ratio (v/v) at which maximum cycling efficiency is obtained depends on which saturated cosolvent is employed. These preferred ratios (at the given LiAsF$_6$ concentrations) are: 90 DEE:10 Dioxolane (2.5 M); 95 DEE:5 tetrahydrofuran (THF) (1.5 M); 90 DEE:10 THF (2.5 M); and 80 DEE:20 Dimethoxyethane (DME) (2.0 M).

FIG. 2 shows that, as would be expected, when the DEE proportion falls below about 70%, cycling efficiency falls off rapidly. The unexpected phenomenon illustrated by the curves is that use of small amounts of any of the saturated cosolvents not only fails to lower cycling efficiency, but actually results in efficiency superior to that of pure DEE. FIG. 2 shows that any proportion of THF, DME, or Dioxolane up to about 20% yields an electrolyte whose efficiency is higher than that of 100% DEE. DEE's open chain structure is thought to be responsible for its low Li reactivity, and thus its high cycling efficiency. The mechanism by which addition of THF, DME, or Dioxolane, all relatively reactive structures, increases cycling efficiency is not known.

Figure 3:
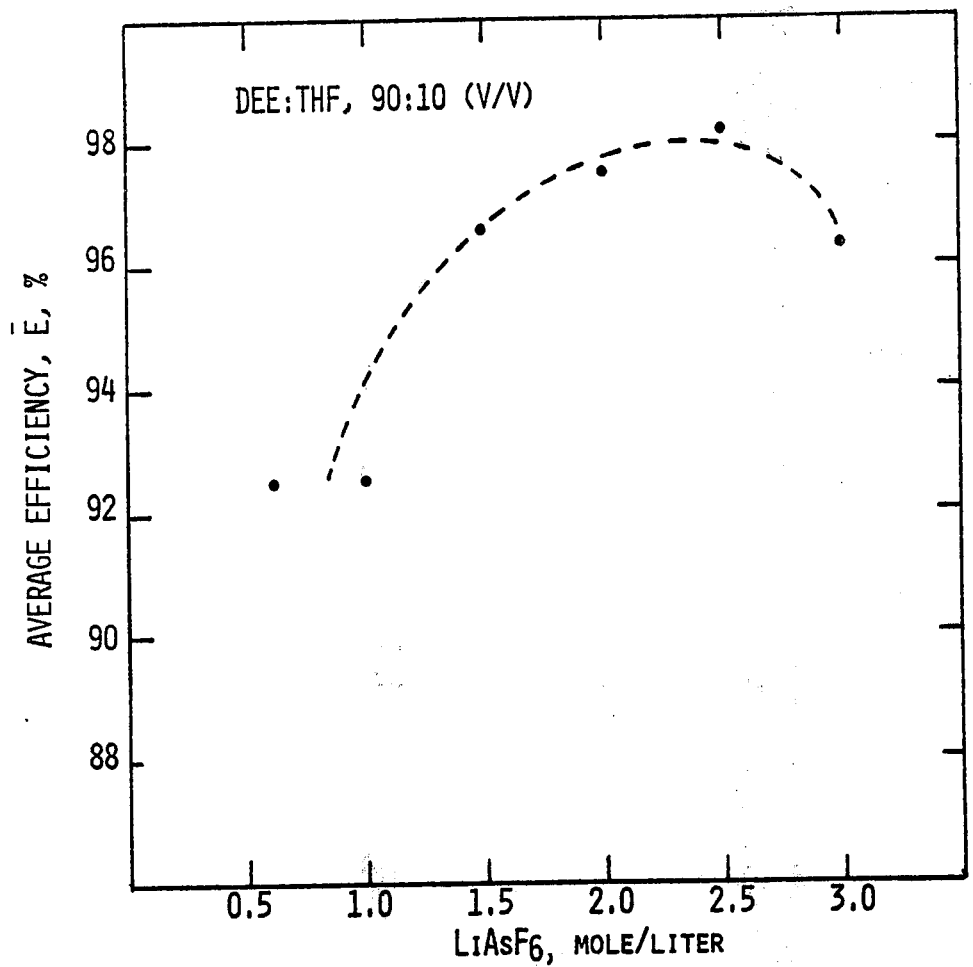
FIG. 3 is a graph of the relation between cycling efficiency and $LiAsF_6$ concentration in the electrolyte composition $LiAsF_6$/90 DEE:10THF.
Figure 6:
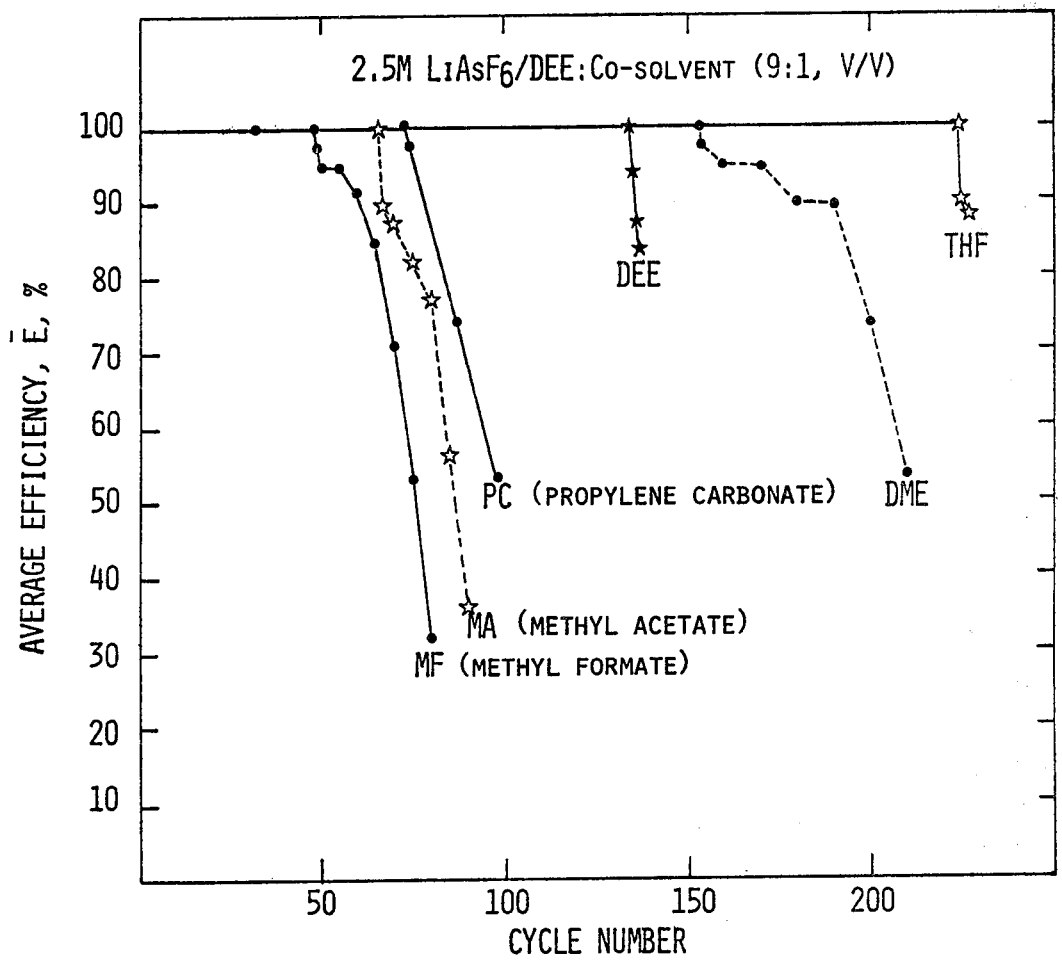
FIG. 6 is a graph comparing cycling efficiency for several binary electrolytes.

An important advantage of blends having high DEE content is their ability to dissolve large amounts of salt, so that the blends are useful in a variety of situations. FIG. 3 shows that for 90 DEE:10 THF, maximum average cycling efficiency is obtained with 2.5 M LiAsF$_6$. This blend also provides over 200 "100"% efficient cycles, as shown in FIG. 6.

Figure 4:
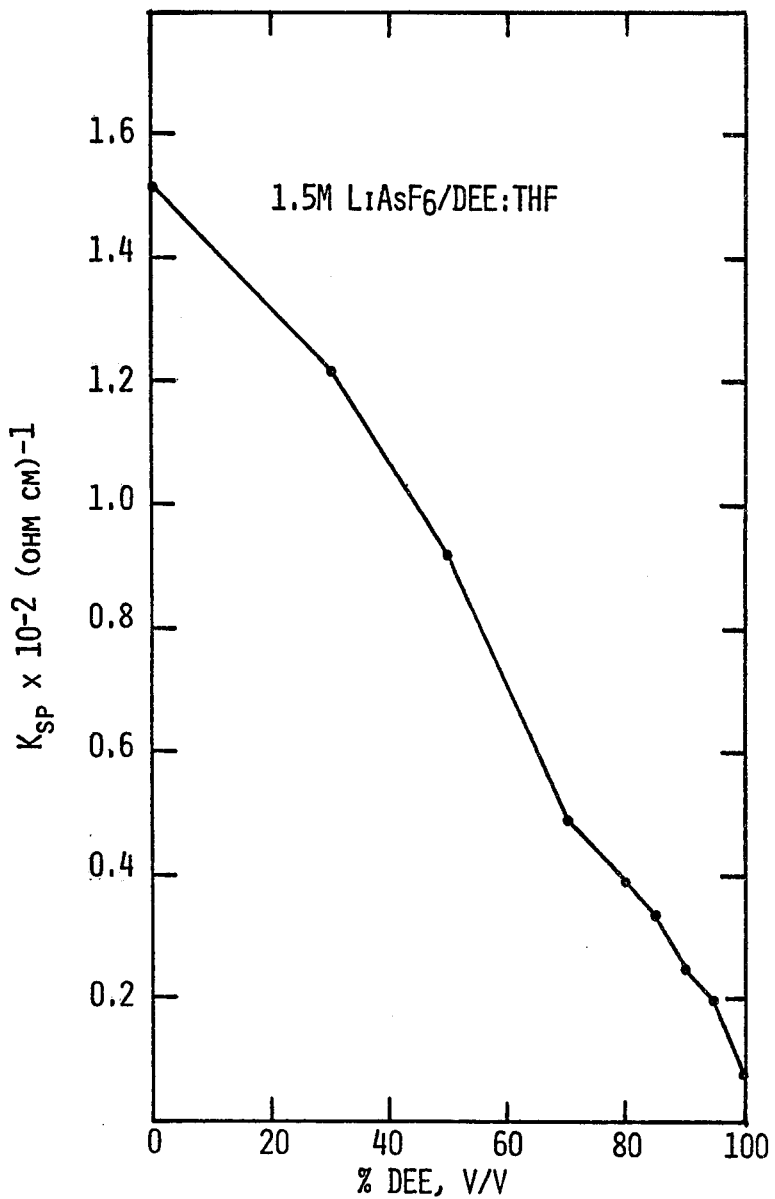
FIG. 4 is a graph of the relation between conductivity and % DEE in the binary electrolyte 1.5 M $LiAsF_6$/DEE:THF.

FIG. 4 shows that for DEE:THF, electrolyte conductivity increases with increased THF content. This means that any proportion of THF up to about 20% provides both superior cycling efficiency (see FIG. 2) and superior conductivity compared to 100% DEE. However, THF proportions greater than 20% may be desirable for some purposes, if conductivity is very important, and the user is willing to sacrifice some cycling efficiency in return for greater conductivity. An important advantage of the invention is that, over certain proportion ranges, even when such a sacrifice in efficiency (i.e., increase in the shortfall from 100% efficiency) is present, it will (surprisingly) be proportionally less than the gain in conductivity. The same considerations will govern the choice of the desired proportion of DME, Dioxolane, or any of the other cosolvents used in the invention.

Figure 5:
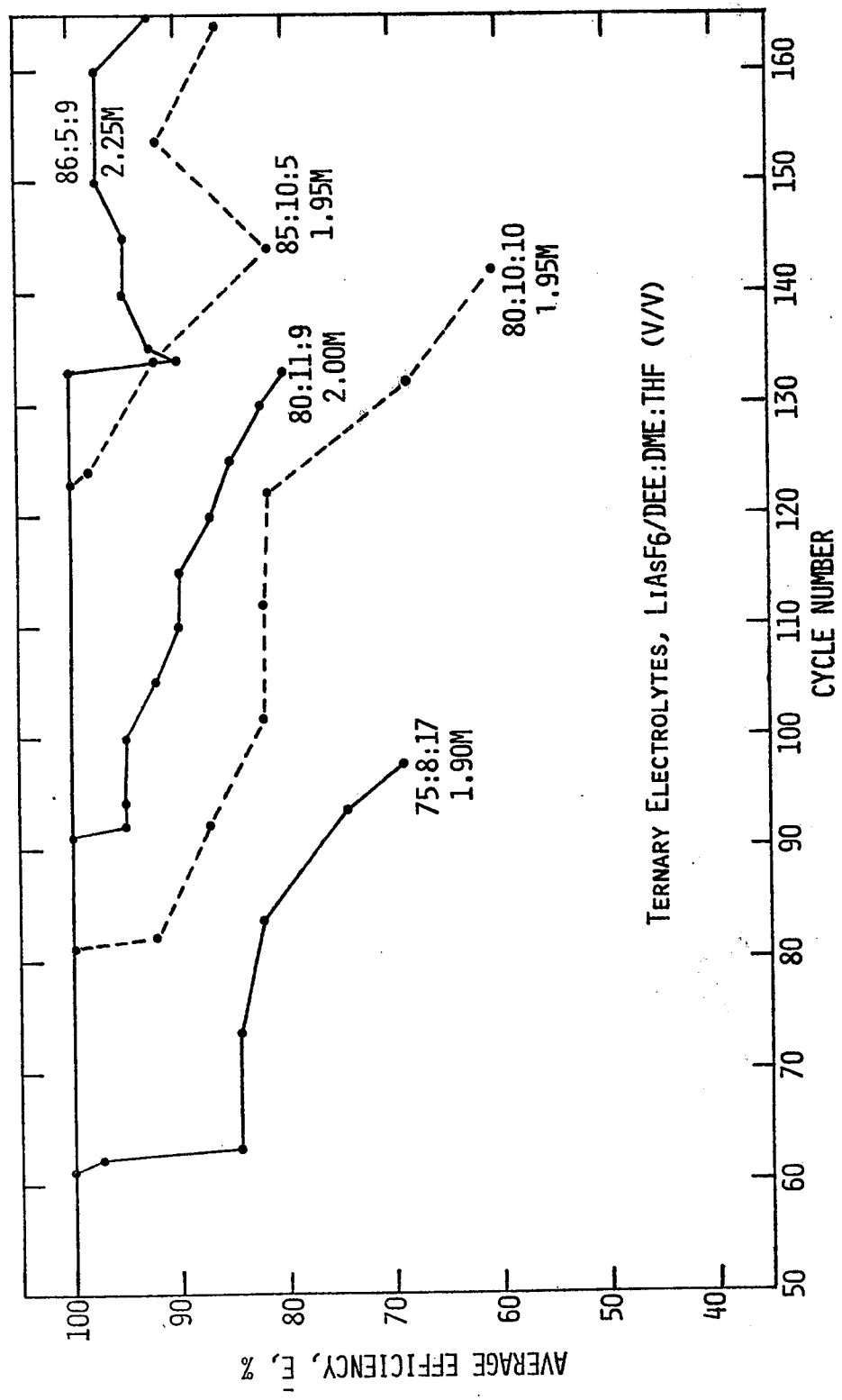
FIG. 5 is a graph of the relation between cycling efficiency and solvent component proportions in five saturated ternary electrolytes.

FIG. 5 shows the relative cycling efficiencies of various DEE:DME:THF blends. Maximum efficiency is obtained, with 2.25 M LiAsF$_6$, in 86 DEE:5 DME:7 THF; however, this blend is less efficient than the best binary blend, 2.5 M LiAsF$_6$ in 90 DEE:10 THF.

In addition to the cosolvents named above, other saturated compounds have proven useful. These include the acyclic monoether, dimethylether, which produces a cycling efficiency of 97.6% in 90% DEE; and the cyclic diether, ethyl tetrahydrofurfuryl ether, which produces a cycling efficiency of 97.6% in 90% DEE. There are also certain unsaturated cosolvents which produce good results. These include the unsaturated cyclic monoethers, 2-methylfuran, which produces a cycling efficiency of 98.5%, furan which produces a cycling efficiency of 98.0%, and 2,5-dimethylfuran which produces a cycling efficiency of 97.7%; and the unsaturated nitrogen-containing heterocycles, N-methylpyrrole, which produces a cycling efficiency of 98.2%, and 3.5-dimethylisoxazole, which produces a cycling efficiency of 98.0%; all in 90% DEE with 2.5 M LiAsF$_6$ concentration.

A preferred class of lithium salts is the class having the formula LiXY$_6$, where X is As, P, Sb, or Bi, and Y is a halogen. A preferred example is LiAsF$_6$. Other lithium salts may be useful as well.

The table below illustrates an unexpected layering phenomenon observed in the 90 DEE: 10 DME (v/v) electrolyte. This phenomenon is an additional factor to be considered when selecting cosolvents, cosolvent proportions, and salt concentrations.

SOLUTION HOMOGENEITY AS A FUNCTION
OF LiAsF$_6$ CONCENTRATION
IN THE 90 DEE:10 DME ELECTROLYTE AT 25° C.

| [LiAsF$_6$], M | Physical Appearance |
| --- | --- |
| 1.50 | 2 immiscible layers |
| 1.75 | 2 immiscible layers |
| 2.00 | homogeneous solution |
| 2.25 | homogeneous solution |

Thus, this electrolyte was observed to separate into two phases at LiAsF$_6$ concentrations below 1.9 M, while at higher salt concentrations, this undesirable phenomenon did not occur. Other electrolyte blends, both binary and ternary, exhibited this phenomenon at salt concentrations below certain threshold levels; two are tubulated below.

| Minimum LiAsF$_6$ Concentration at 25° C. Required for a Homogeneous Solution, M | Electrolyte Blend |
| --- | --- |
| 1.85 | 75 DEE:15 DME:10 THF |
| 0.70 | 90 DEE:10 3,5-dimethylisoxazole |

For the three blends tested in which layering was observed, the threshold LiAsF$_6$ levels increased with lower proportional DEE levels. Addition of cosolvents like THF or 2-methylfuran did not prevent layering, as we thought they might. The critical parameter thus appears to be sufficient LiAsF$_6$ concentration to prevent phase separation.

For unknown reasons, the layering phenomenon did not occur at any LiAsF$_6$ concentration in any DEE:THF, DEE:2-methylpyrrole, or DEE:2-methylfuran blends.

What is claimed is:

1. A rechargable electrochemical cell comprising a lithium-containing electrode and an electrolyte, said electrolyte comprising:
   diethyl ether,
   a cosolvent, and
   a lithium salt,
   wherein said diethyl ether and said cosolvent are present in proportional amounts greater than or equal to 70 percent and 5 percent by volume, respectively, said amounts being selected to produce an increase in conductivity compared to that of pure diethyl ether proportionally equal to or greater than any decrease in cycling efficiency compared to pure diethyl ether.

2. The cell of claim 1 wherein said cosolvent is present in an amount which does not decrease cycling efficiency compared to pure diethyl ether.

3. The cell of claim 2 wherein said cosolvent is present in an amount which increases cycling efficiency compared to pure diethyl ether.

4. The cell of claim 1 wherein said cosolvent comprises a saturated compound.

5. The cell of claim 4 wherein said saturated compound comprises a saturated ether.

6. The cell of claim 5 wherein said saturated either consists of tetrahydrofuran.

7. The cell of claim 5 wherein said saturated ether consists of dimethoxyethane.

8. The cell of claim 5 wherein said saturated ether consists of 1, 3-dioxolane.

9. The cell of claim 5 wherein said saturated ether consists of dimethylether.

10. The cell of claim 5 wherein said saturated ether consists of ethyl tetrahydrofurfuryl ether.

11. The cell of claim 1 wherein said cosolvent comprises an unsaturated compound.

12. The cell of claim 1 wherein said cosolvent comprises a furan.

13. The cell of claim 11 wherein said unsaturated compound consists of 2-methylfuran.

14. The cell of claim 11 wherein said unsaturated compound consists of 2,5-dimethylfuran.

15. The cell of claim 11 wherein said unsaturated compound consists of N-methylpyrrole.

16. The cell of claim 11 wherein said unsaturated compound consists of 3, 5- dimethylisoxazole.

17. The cell of claim 1, further comprising a second cosolvent.

18. The cell of claim 17 wherein said second cosolvent consists of a saturated ether.

19. The cell of either of claims 1 or 17 wherein said lithium salt is present in a concentration sufficient to prevent the separation of said electrolyte into layers.

20. The cell of claim 1 wherein said diethyl ether is present in a proportional amount equal to or greater than 80% by volume.

21. The cell of claim 1 wherein said diethyl ether is present in a proportional amount equal to or greater than 90% by volume.

22. The cell of claim 6 wherein said diethyl ether is present in a proportional amount equal to or greater than 90%, and said tetrahydrofuran is present in an amount equal to or less than 10%.

23. The cell of claim 1 wherein said lithium salt consists of LiAsF$_6$.

* * * * *

UNITED STATES PATENT AND TRADEMARK OFFICE
CERTIFICATE OF CORRECTION

PATENT NO. : 4,252,876
DATED : February 24, 1981
INVENTOR(S) : Victor R. Koch

It is certified that error appears in the above-identified patent and that said Letters Patent are hereby corrected as shown below:

Column 3, line 27, "is $>$ 100%" should be --is $<$ 100%--.

Signed and Sealed this

Twenty-sixth Day of May 1981

[SEAL]

Attest:

RENE D. TEGTMEYER

Attesting Officer

Acting Commissioner of Patents and Trademarks